(12) United States Patent
Janmey

(10) Patent No.: US 6,936,079 B2
(45) Date of Patent: Aug. 30, 2005

(54) PROCESS FOR ASSEMBLING AN ELECTROCHEMICAL CELL

(75) Inventor: Robert M. Janmey, North Ridgeville, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 77 days.

(21) Appl. No.: 10/108,907

(22) Filed: Mar. 28, 2002

(65) Prior Publication Data

US 2003/0182791 A1 Oct. 2, 2003

(51) Int. Cl.[7] .............................. H01M 2/14; H01M 6/06
(52) U.S. Cl. ...................................... 29/623.1; 429/133
(58) Field of Search .............................. 29/623.1, 729, 29/730; 429/133–135, 175, 185, 186

(56) References Cited

U.S. PATENT DOCUMENTS

| | | | |
|---|---|---|---|
| 3,056,849 A | 10/1962 | Warren et al. | 136/83 |
| 3,756,859 A | 9/1973 | Krey | 136/107 |
| 3,888,700 A | 6/1975 | Larsen | 136/146 |
| 4,684,589 A | 8/1987 | Van Dyke, Jr. | 429/184 |
| 5,478,669 A * | 12/1995 | Flack | 429/174 |
| 5,607,796 A * | 3/1997 | Jacus et al. | 429/165 |
| 5,855,627 A * | 1/1999 | Huhndorff et al. | 29/623.2 |
| 6,248,473 B1 | 6/2001 | Lonsberry | 429/169 |
| 6,294,283 B1 | 9/2001 | Tucholski et al. | 429/54 |

FOREIGN PATENT DOCUMENTS

| JP | 7134977 | 5/1995 | |
|---|---|---|---|
| JP | 09063596 | 3/1997 | H01M/6/08 |
| JP | 2001-266904 | 9/2001 | H01M/6/06 |
| JP | 2001266904 A * | 9/2001 | H01M/6/06 |

* cited by examiner

Primary Examiner—Gregg Cantelmo
(74) Attorney, Agent, or Firm—Stewart A. Fraser

(57) ABSTRACT

A process for assembling an electrochemical cell that utilizes an electrode containment shield to prevent internal electrical short circuits that are caused by fragments of a frangible electrode coming into contact with the battery's opposing electrode. The shield, which may be secured to the current collector, is particularly useful with low volume seals that do not support the separator.

27 Claims, 14 Drawing Sheets

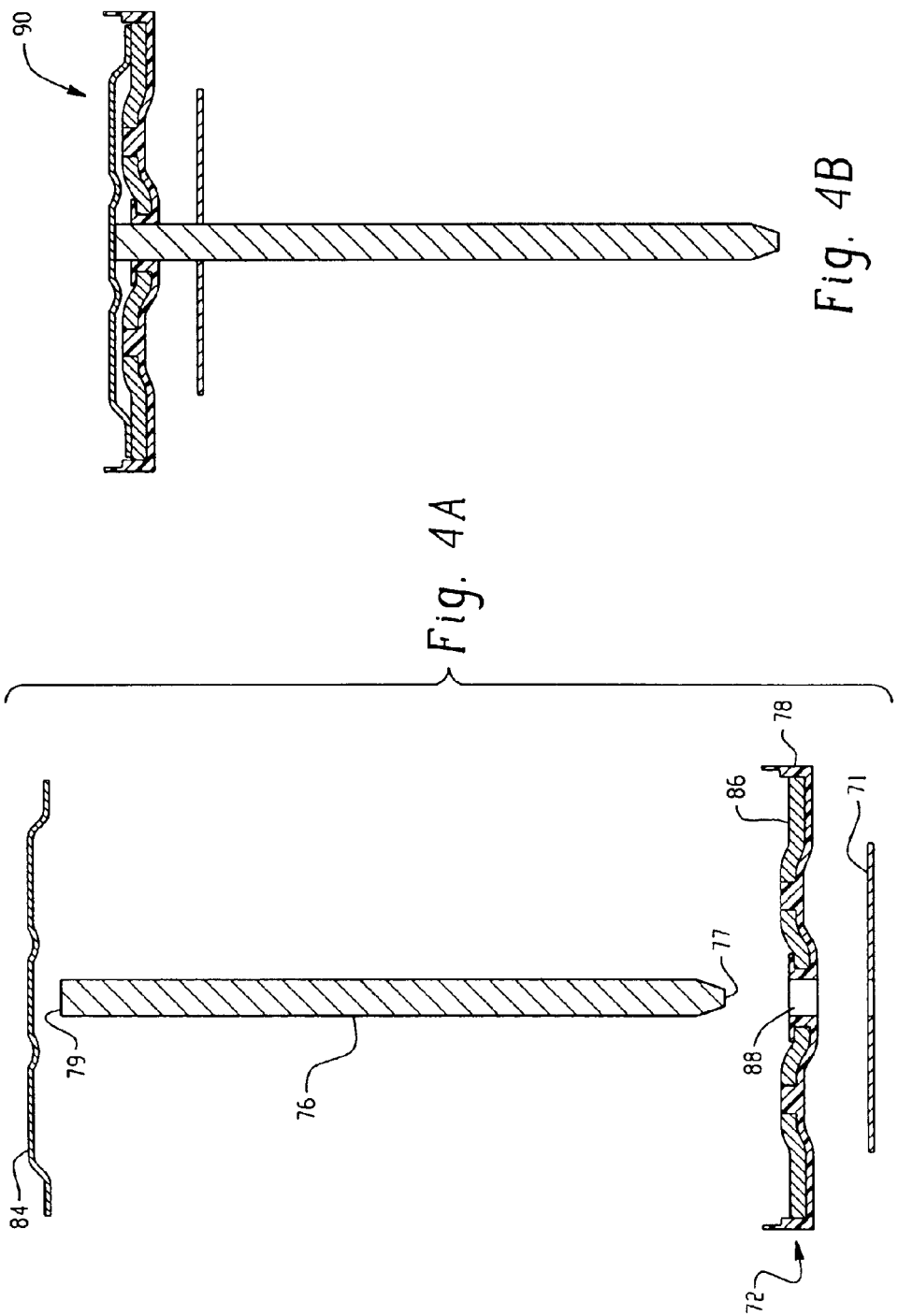

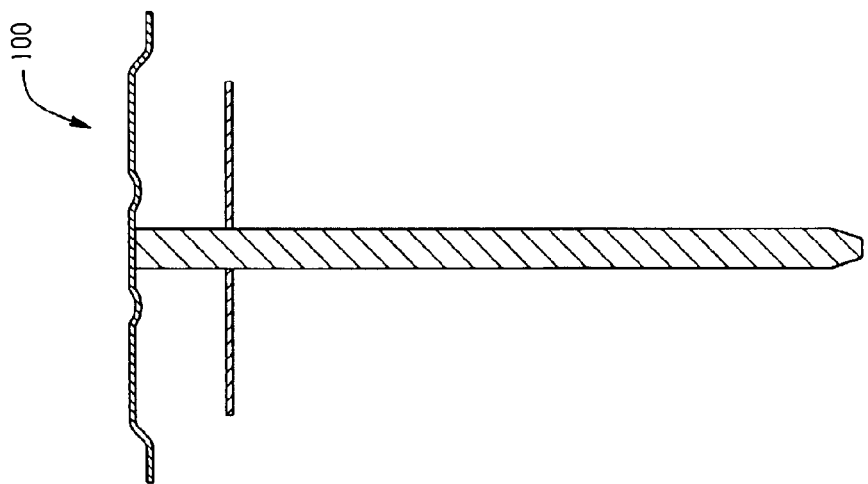
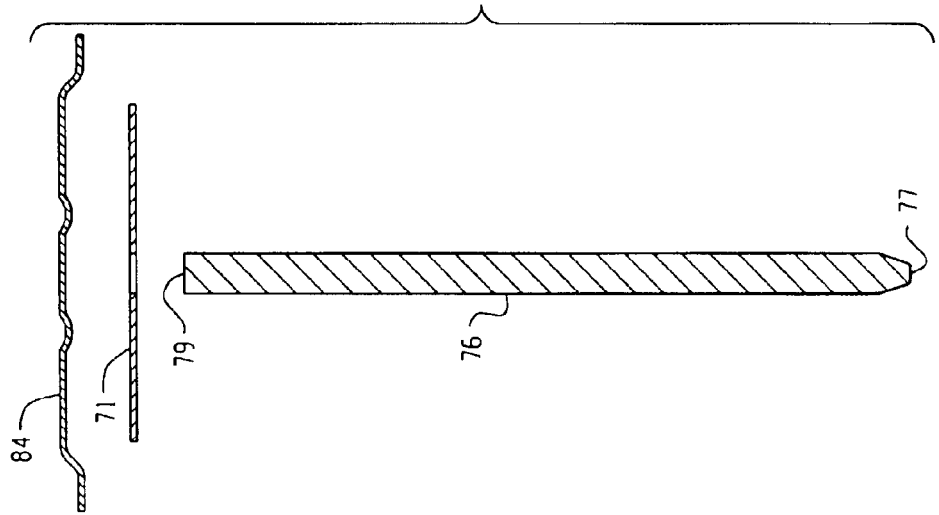

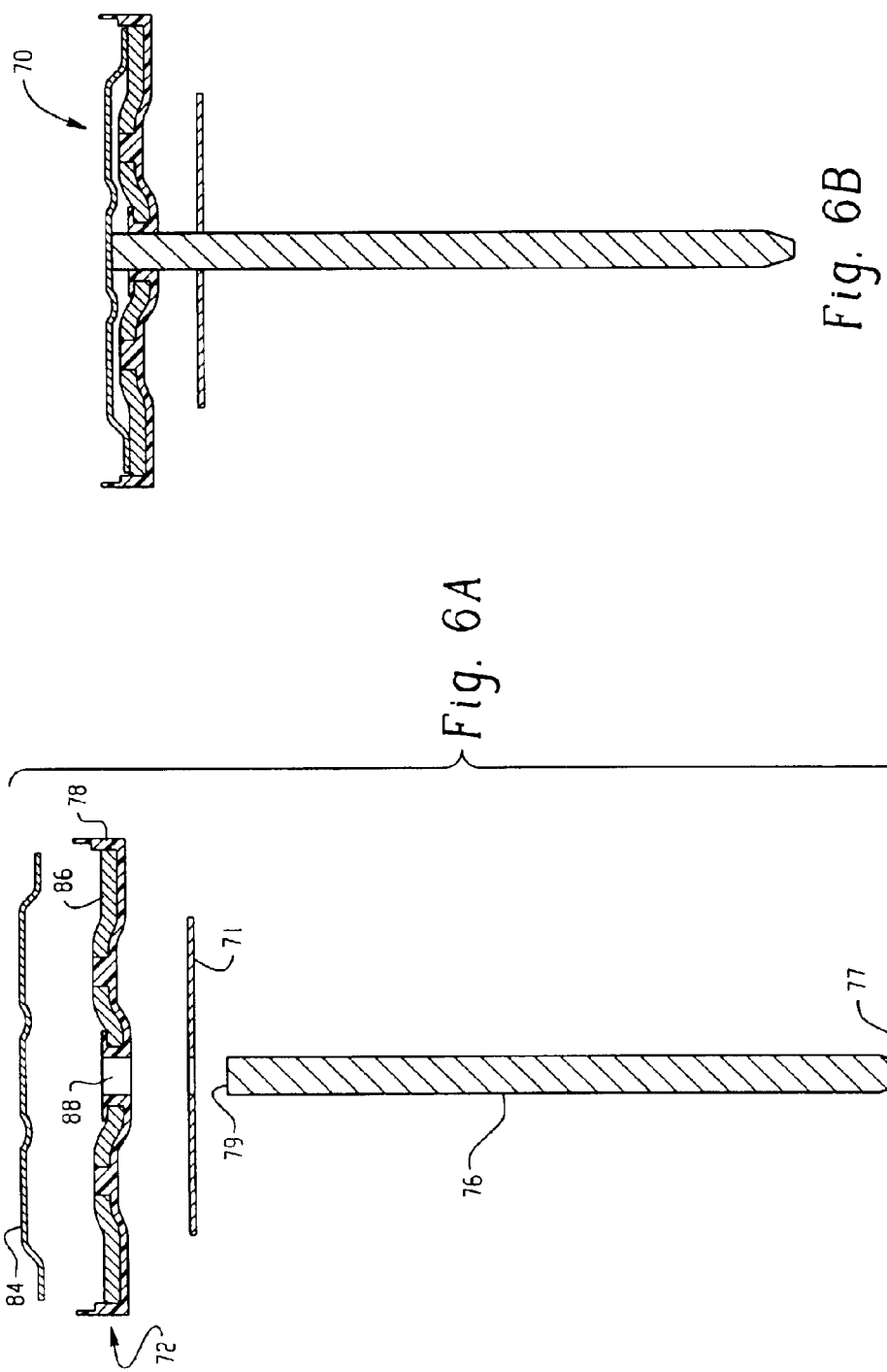

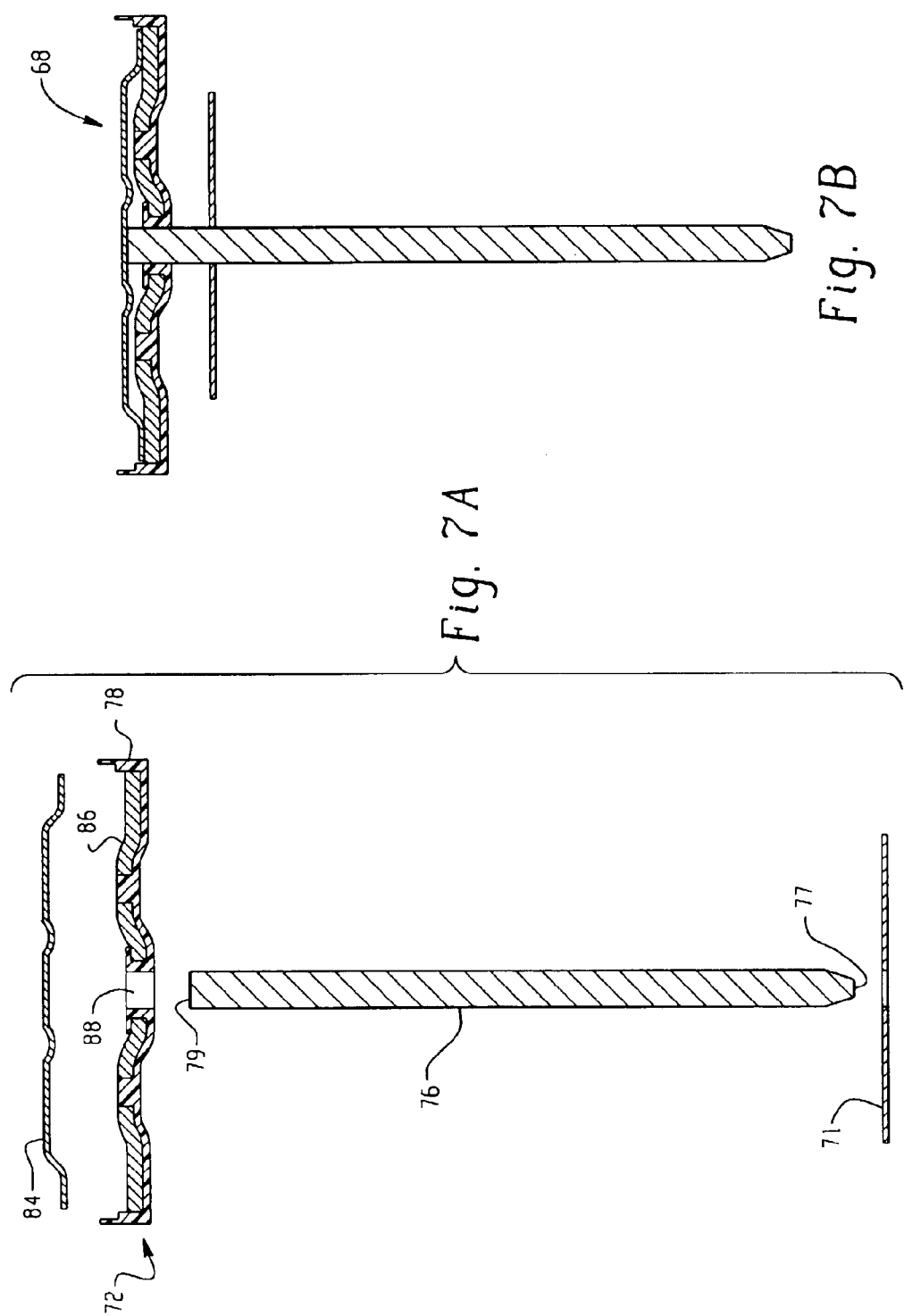

PROCESS FOR ASSEMBLING AN ELECTROCHEMICAL CELL

BACKGROUND OF THE INVENTION

This invention generally relates to a process for assembling electrochemical cells having a frangible electrode and, more particularly, to cells having a current collector assembly with a shield secured thereto which limits movement of the frangible electrode.

Cylindrically shaped batteries are suitable for use by consumers in a wide variety of devices such as flashlights, radios and cameras. Batteries used in these devices typically employ a cylindrical metal container to house two electrodes, a separator, a quantity of electrolyte and a closure assembly that includes a current collector. Typical electrode materials include manganese dioxide as the cathode and zinc as the anode. The zinc is commonly employed in particulate form suspended in a gel. An aqueous solution of potassium hydroxide is a common electrolyte. A separator, conventionally formed from one or more strips of paper, is positioned between the electrodes. The electrolyte is readily absorbed by the separator and gelling medium.

One of the issues that battery manufacturers must address is the requirement that direct contact between the anode and cathode within the battery be prevented. If the anode and cathode are allowed to physically contact one another, a chemical reaction takes place and the useful electrochemical capacity of the battery is reduced. The function of the separator is to prevent direct contact between the anode and cathode while allowing for ionic conductivity therebetween.

Small cylindrical batteries must be manufactured to withstand the physical rigors associated with the manufacturing and distribution processes as well as the handling of batteries by consumers. In particular, batteries must be able to withstand being accidentally dropped by consumers. In batteries with a frangible electrode, such as the gelled anode used in many cylindrical alkaline batteries, dropping the battery may cause a small portion of the anode to fragment and thereby break free from the rest of the anode. The fragmented anode must be prevented from coming into direct contact with the cathode. Similarly, if the cathode is hard and susceptible to fragmentation when the cell is dropped, small fragments of the cathode may become separated from the body of the cathode and need to be contained. As shown in FIG. 1, many conventional cell constructions have addressed this problem by using an elastomeric seal 78 that includes a V-shaped leg 80 that projects toward the interior of the cell and contacts the top of the coiled separator 20 thereby forming a barrier that prevents anode fragments 64 from contacting cathode 54. However, the V-shaped projections on the conventional seal designs occupy a portion of the cell's internal volume which could be better used to hold an additional quantity of the cell's electrochemically active materials. Consequently, many cell designs have been proposed that utilize low volume seals which do not cooperate with the separator to form a barrier that isolates the anode from the cathode. Unfortunately, eliminating the portion of the seal that helps to contain the anode has led to an increased level of internal electrical shorting between the anode and cathode when cells are dropped by consumers. The internal shorting problem is due to the freestanding portion of the separator, located above the anode/cathode interface, losing its stiffness when it absorbs some of the cell's electrolyte and then collapsing away from the low volume seal so that an unobstructed path is created between the anode and the cathode. As shown in FIG. 2, the collapsed portion 46 of the separator 20 has allowed a fragment 64 of anode 66 to contact cathode 54.

One solution to the problem of preventing internal electrical short circuits caused by fragmented electrodes in cylindrical alkaline batteries is disclosed in Japanese Kokai Patent Application No. 7 [1995]-134977. In one embodiment, this reference discloses applying an adhesive to a portion of the separator where the separator and sealing gasket contact one another. The adhesive secures the separator to the gasket so that small portions of the electrode that break free when the battery is dropped will not be able to contact the opposing electrode and cause an internal short circuit. One disadvantage with this approach is that the application of the adhesive to the edge of the separator in a large scale commercial manufacturing operation would slow down the production process thereby increasing the cost of the battery.

Disclosed in U.S. Pat. No. 3,056,849 is a cell construction with a washer placed on top of an out-turned edge of the separator that overlays the depolarizer and thus prevents the anode slurry from contacting the depolarizer cylinder. One disadvantage of this cell construction is that the washer effectively limits the height of the depolarizer and thus reduces the discharge capacity of the cell.

U.S. Pat. No. 3,756,859 discloses a process for assembling an annular disc on top of a depolarizer mass body. The body is covered at its upper end with the annular disk and then a carbon rod is inserted through the disk and into the depolarizer body. This process discloses the placement of the disk and carbon rod in two separate steps.

U.S. Pat. No. 3,888,700 discloses a cell assembly process that includes a plastic or paper compression washer and a carbon pencil which serves as a current collector. The washer has a hole therein to receive the carbon pencil. The disclosed process inserts the cathode mix into the container and then the carbon pencil is driven into the cathode mix. The washer is then placed on top of the cathode mix so that the carbon pencil aligns with the hole in the washer. This process also discloses the placement of the washer and carbon pencil in two separate steps.

There exists a need for a process that provides a cell with a volume efficient electrode containment shield that can be accurately and economically located within the cell and will prevent undesirable movement of a frangible electrode's fragments so that the cell does not experience an internal electrical short circuit when the cell is dropped. The shield should occupy a minimum amount of the cell's internal volume and should be compatible with low volume seal bodies that do not provide structural support to the cell's separator.

BRIEF SUMMARY OF THE INVENTION

The present invention provides a process for assembling an electrochemical cell with an electrode containment shield that is preassembled onto another cell component before the shield is inserted into the cell. Consequently, the shield can be accurately and cost effectively positioned within the cell so that fragments of a frangible electrode that become dislodged when the cell is dropped are safely contained and do not cause an internal electrical short circuit.

In one embodiment, the process of the present invention includes the following steps. In a step, providing a cylindrical open ended container having a first electrode that defines a tubularly shaped cavity. A separator lines the cavity. A second electrode, which contains a frangible composition including particulate zinc, is disposed within the separator lined cavity. In another step, producing a current collector assembly having a cover, an electrode containment shield with a width less than the inside diameter of the container's open end and an elongated electrically conductive member having a first end and a second end. The assembly is produced by contacting an end of the electrically conductive member to the cover and inserting an end of the electrically conductive member perpendicularly through a disc shaped electrode containment shield thereby forming a preassembled current collector assembly. The first end of the conductive member contacts the cover. The second end of the conductive member forms a freestanding end that extends from the shield. In another step, the preassembled current collector assembly is joined to the open end of the container by inserting the second end of the assembly's conductive member into the second electrode and securing the current collector assembly to the open end of the container whereby the electrode containment shield is positioned between the cover and the second electrode.

BRIEF DESCRIPTION OF THE DRAWINGS

FIG. 4A is an exploded view of a current collector assembly;

FIG. 4B is cross sectional view of a current collector assembly;

FIG. 5A is an exploded view of a current collector assembly;

FIG. 5B is cross sectional view of a current collector assembly;

FIG. 6A is an exploded view of a current collector assembly;

FIG. 6B is cross sectional view of a current collector assembly;

FIG. 7A is an exploded view of a current collector assembly;

FIG. 7B is cross sectional view of a current collector assembly;

DETAILED DESCRIPTION OF THE INVENTION

Figure 9:
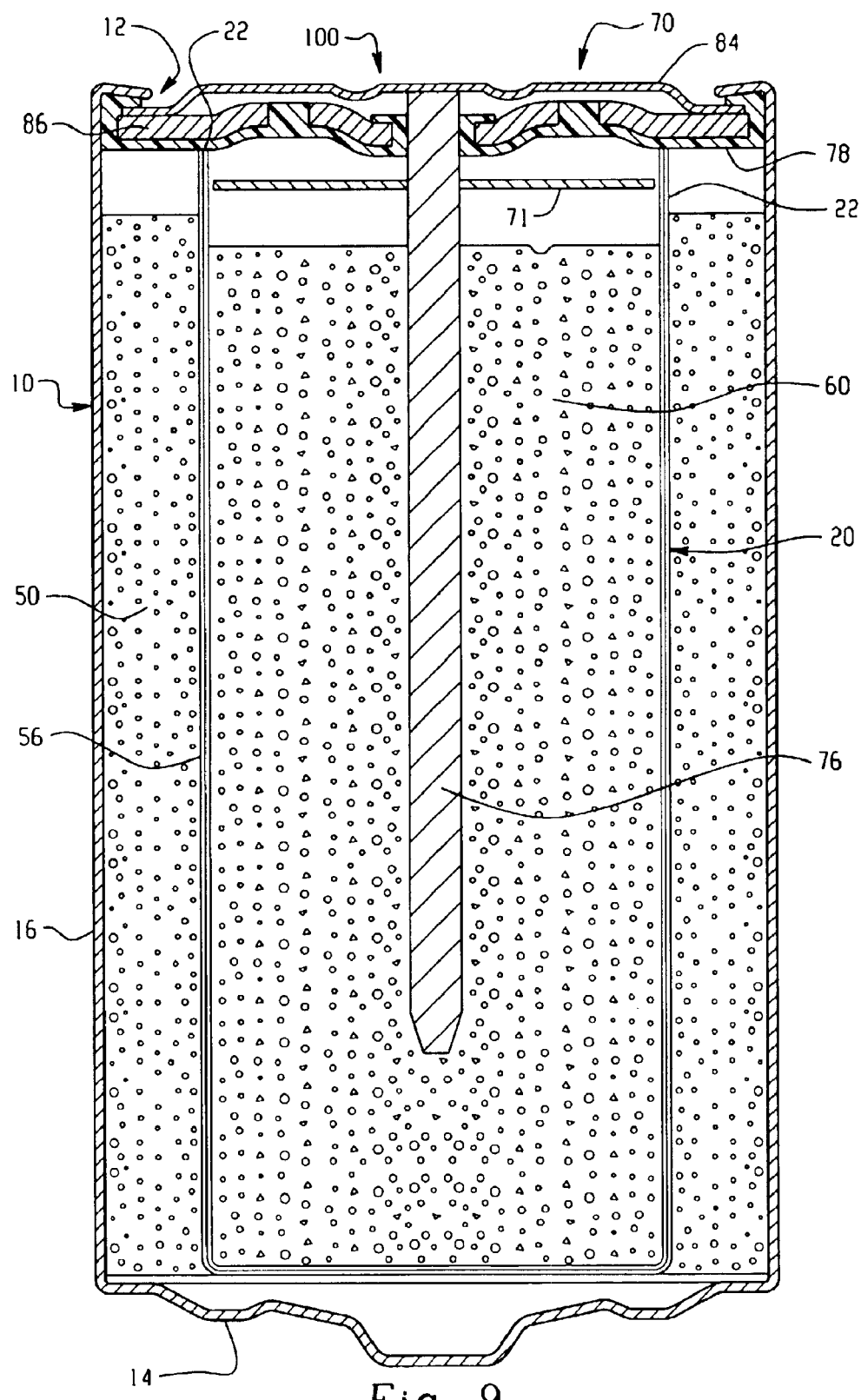
FIG. 9 is a cross section of an electrochemical cell manufactured by a process of this invention.

Referring now to the drawings and more particularly to FIG. 9, there is shown a cross-sectional view of an assembled electrochemical cell made by a process of this invention. Beginning with the exterior of the cell, the cell's components are the container 10, first electrode 50 positioned adjacent the interior surface of container 10, separator 20 which forms a lining against the interior surface 56 of first electrode 50, second electrode 60 disposed within the cavity defined by separator 20 and current collector assembly 70 secured to container 10. In this embodiment, collector assembly 70 includes current collector 76, electrode containment shield 71, seal body 78, inner cover 86 and terminal cover 84. Container 10 has an open end 12, a closed end 14 and a sidewall 16 therebetween. The closed end 14, sidewall 16 and current collector assembly 70 define an internal volume in which the cell's electrodes are housed.

Figure 10:
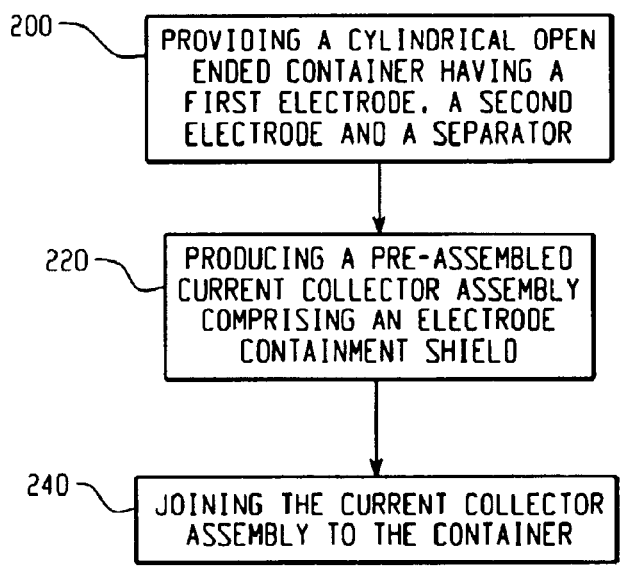
FIG. 10 is a chart showing the steps of this invention's cell manufacturing process.

Referring to the flow chart shown in FIG. 10, the process of this invention comprises the following steps. In step 200, providing a cylindrical open ended container housing a first electrode which defines a tubularly shaped cavity, a separator lining the cavity and a second electrode comprising a frangible composition including particulate zinc disposed within the cavity. In step 220, a current collector assembly comprising an electrode containment shield is produced. The assembly comprises a cover for the electrochemical cell, an electrode containment shield having a width less than the inside diameter of the container's open end and an elongated electrically conductive member having a first end and a second end. The assembly is produced by contacting an end of the electrically conductive member to the cover and inserting an end of the electrically conductive member through a disc shaped electrode containment shield thereby forming a preassembled current collector assembly. The first end of the electrically conductive member contacts the cover and the second end of the electrically conductive member forms a freestanding end that extends from the shield. In step 240, the preassembled current collector assembly is joined to the open end of the container. This step includes inserting the second end of the assembly's conductive member into the second electrode and securing the current collector assembly to the open end of the container such that the electrode containment shield is positioned between the cover and the second electrode.

Figure 8:
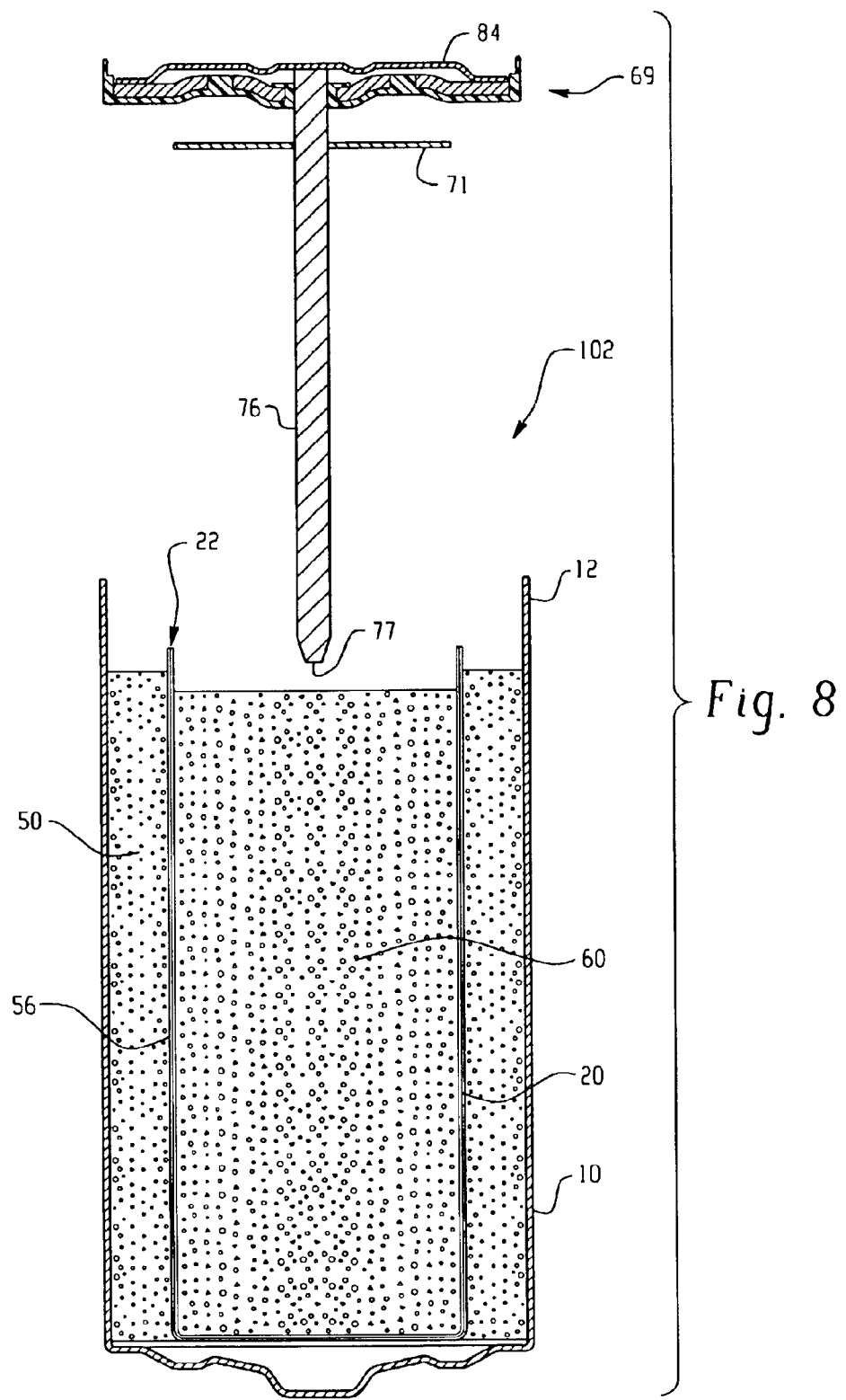
FIG. 8 is an exploded view of the components used to assemble the cell shown in FIG. 9.

Disclosed in FIG. 8 is a preferred embodiment of an open ended container useful in a process of this invention. First electrode 50 is a mixture of manganese dioxide, graphite and an aqueous solution containing potassium hydroxide. Electrode 50 is formed by disposing a quantity of the mixture into the open ended container and then using a ram to mold the mixture into a solid tubular shape that defines a cavity which is concentric with the sidewall of the container. First electrode 50 has an interior surface 56. Alternatively, the cathode may be formed by preforming a plurality of rings from the mixture comprising manganese dioxide and then inserting the rings into the container to form the tubularly shaped first electrode.

Separator 20 is a film that is typically made from nonwoven fibers. One of the separator's functions is to provide a barrier at the interface of the first and second electrodes. The barrier must be electrically insulating and ionically permeable. To form a tubularly shaped compartment, a single sheet of separator may be coiled about an axis. The coiled tube is inserted into the cavity defined by the first electrode so that the tube lines the cavity. The dimensions of the separator are selected so that an edge of the coiled tube extends beyond the first electrode toward the open end of the container.

In a preferred embodiment, second electrode 60 is a frangible homogenous mixture of an aqueous alkaline electrolyte, zinc powder, and a gelling agent such as crosslinked polyacrylic acid. The aqueous alkaline electrolyte comprises an alkaline metal hydroxide such as potassium hydroxide, sodium hydroxide, or mixtures thereof. Potassium hydroxide is preferred. The gelling agent suitable for use in a cell of this invention can be a crosslinked polyacrylic acid, such as Carbopol 940®, which is available from B. F. Goodrich, Performance Materials Division, Cleveland, Ohio, USA. Carboxymethyylcellulose, polyacrylamide and sodium polyacrylate are examples of other gelling agents that are suitable for use in an alkaline electrolyte solution. The zinc powder may be pure zinc or an alloy comprising an appropriate amount of one or more of the metals selected from the group consisting of indium, lead, bismuth, lithium, calcium and aluminum. A suitable anode mixture contains 67 weight percent zinc powder, 0.50 weight percent gelling agent and 32.5 weight percent alkaline electrolyte having 40 weight percent potassium hydroxide. The quantity of zinc can range from 63 percent by weight to 70 percent by weight of the anode. Other components such as gassing inhibitors, organic or inorganic anticorrosive agents, binders or surfactants may be optionally added to the ingredients listed above. Examples of gassing inhibitors or anticorrosive agents can include indium salts (such as indium hydroxide), perfluoroalkyl ammonium salts, alkali metal sulfides, etc. Examples of surfactants can include polyethylene oxide, polyethylene alkylethers, perfluoroalkyl compounds, and the like. The second electrode may be manufactured by combining the ingredients described above into a ribbon blender or drum mixer and then working the mixture into a wet slurry.

Electrolyte suitable for use in a cell made by a process of this invention is a thirty-seven percent by weight aqueous solution of potassium hydroxide. The electrolyte may be incorporated into the cell by disposing a quantity of the fluid electrolyte into the cavity defined by the first electrode. The electrolyte may also be introduced into the cell by allowing the gelling medium to absorb an aqueous solution of potassium hydroxide during the process used to manufacture the second electrode. The method used to incorporate electrolyte into the cell is not critical provided the electrolyte is in contact with the first electrode 50, second electrode 60 and separator 20.

Figure 1:
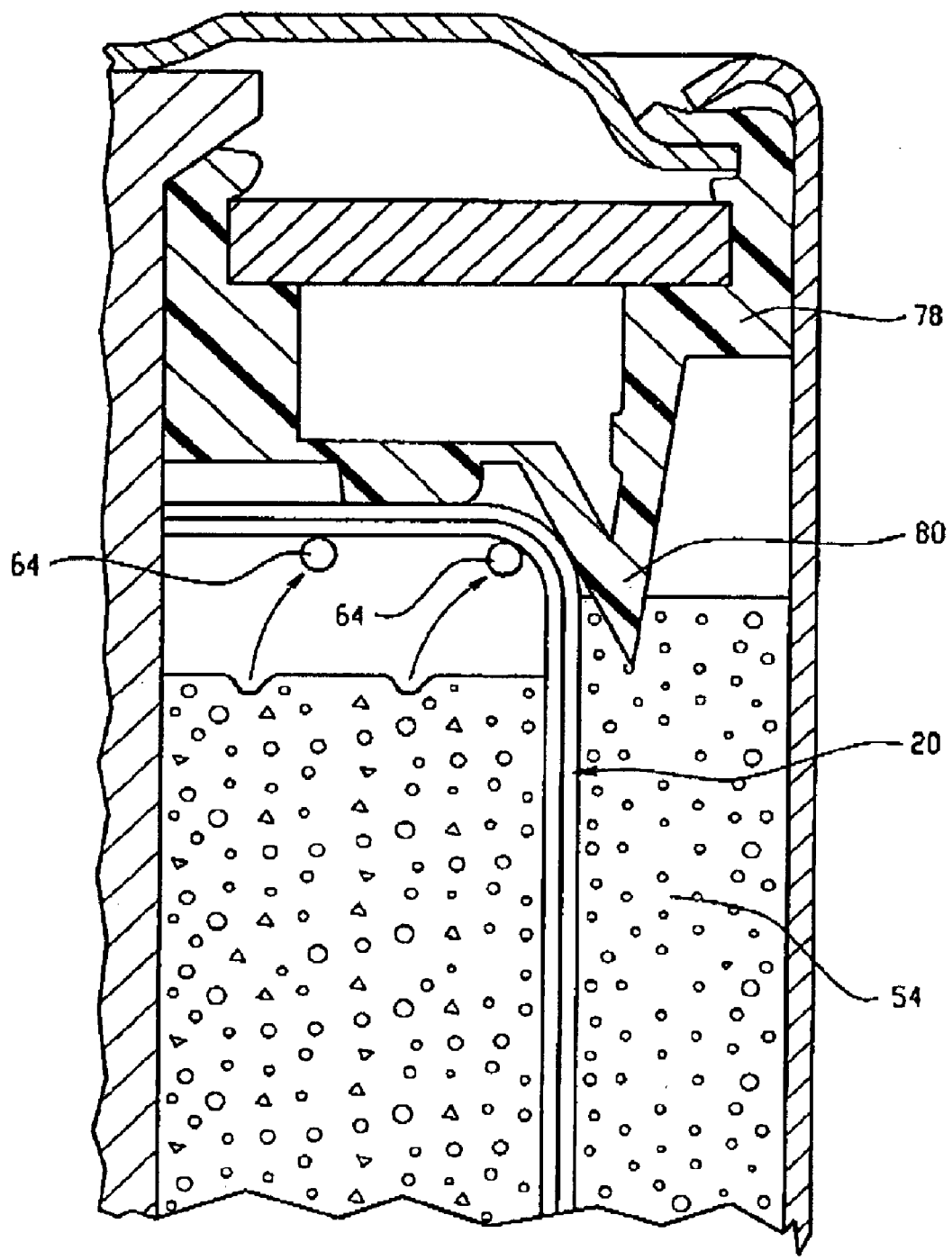
FIG. 1 is a cross section of a conventional alkaline cell.
Figure 2:
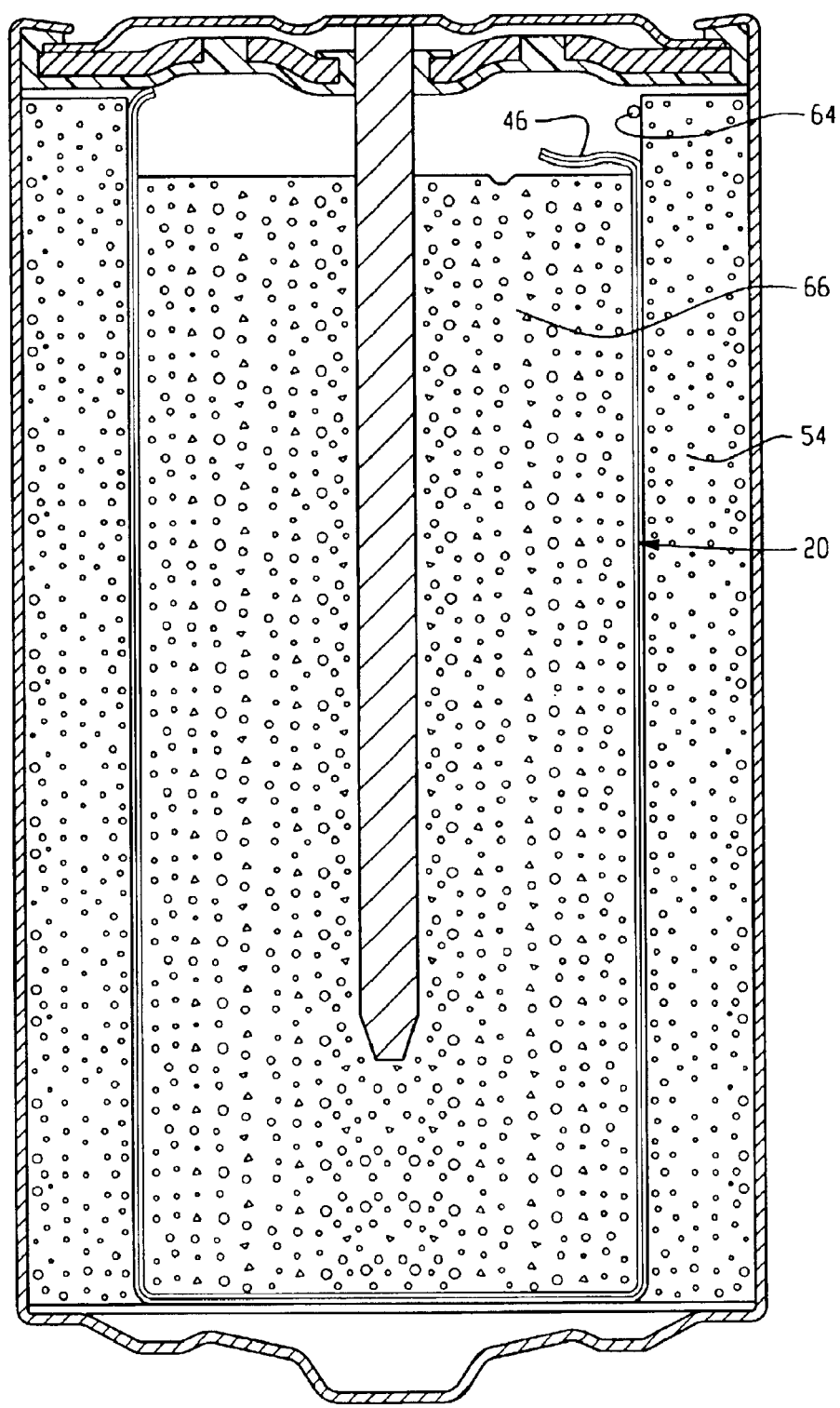
FIG. 2 is a cross section of an alkaline cell containing a low volume seal assembly.
Figure 3B:
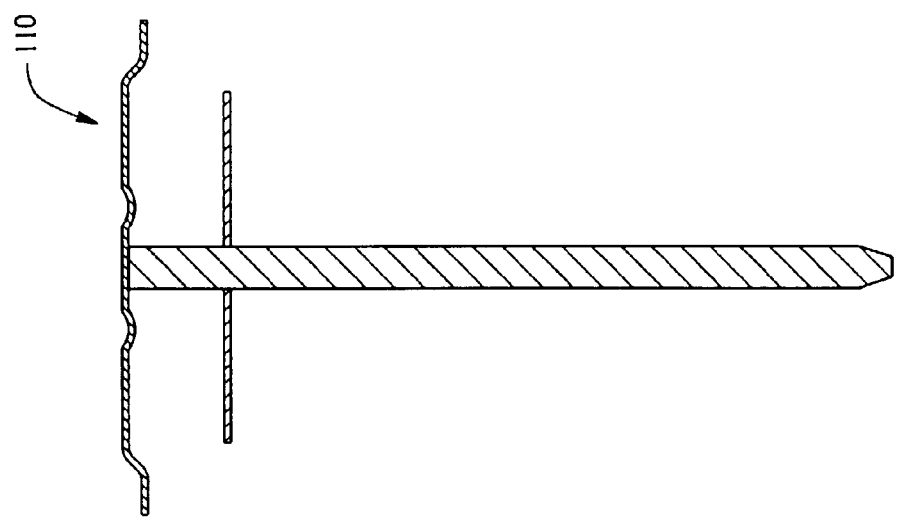
FIG. 3B is cross sectional view of a current collector assembly.
Figure 3A:
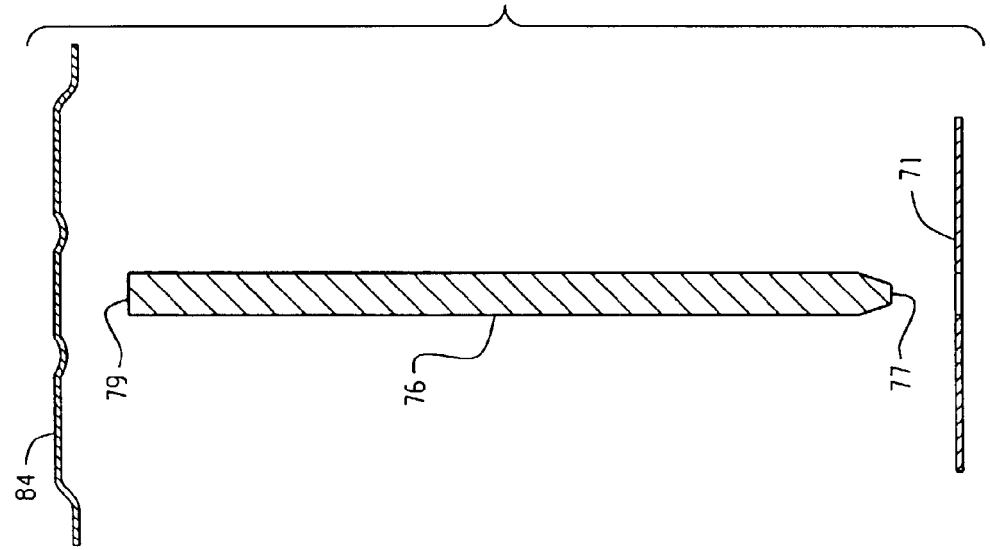
FIG. 3A is an exploded view of a current collector assembly.
Figure 11:
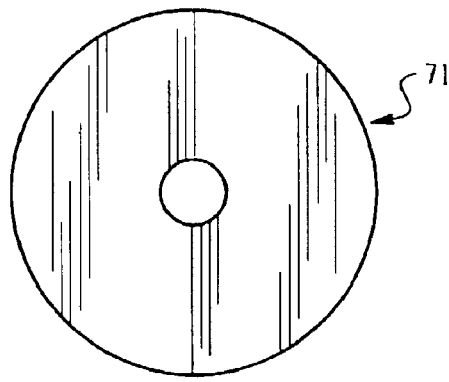
FIG. 11 is a top view of an electrode containment shield.

Shown in FIGS. 3A and 3B is current collector assembly 110 which includes terminal cover 84, current collector 76 and electrode containment shield 71. Current collector 76 is an elongated electrically conductive member made from brass. Collector 76 has a first end 79. referred to herein as the terminal contact end, and a second end 77, referred to herein as the freestanding end. Freestanding end 77 of collector 76 is tapered to facilitate inserting the collector through other cell components such as electrode containment shield 71. Shield 71 is a thin, disc shaped, flexible component made from polypropylene. Alternate materials from which the disc may be made include electrically nonconductive materials such as polyvinyl chlorid; and nylon; as well as electrically conductive materials such as zinc and copper. An interference fit is established between collector 76 and shield 71. As shown in FIG. 11, the center of the shield may be cut out to allow collector 76 to easily pass through the shicid during the assembly process aod to insure that collector 76 is coaxial with the circumference of shield 71.

Specific processes useful in producing current collector assemblies shown in FIGS. 3B and 4B will now be described. Referring to FIG. 3A, current collector 110 can be produced using the following process steps. First, contacting the terminal contact end 79 of collector 76 to terminal cover 84. Then, inserting freestanding end 77 of collector 76 through electrode containment shield 71. In this embodiment, the step of contacting first end 79 of collector 76 to cover 84 precedes inserting freestanding end 77 of collector 76 through electrode containment shield 71. A similar process may be used to produce collector assembly 90 shown in FIG. 4B. In this embodiment, the current collector assembly includes seal body 78 and inner cover 86 as well as collector 76, terminal cover 84 and electrode containment shield 71. When seal body 78 and inner cover 86 are present, the assembly process includes contacting the terminal contact end 79 of collector 76 to terminal cover 84 and bringing seal body 78 into contact with inner cover 86 to form closure member 72. Then, inserting freestanding end 77 of electrode 76 through an opening in seal body 78 and then inserting freestanding end 77 through electrode containment shield 71.

Referring to FIG. 5B, current collector assembly 100 includes current collector 76, terminal cover 84 and electrode containment shield 71. Terminal cover 84 contacts the terminal contact end 79 of elongated current collector 76. Electrode containment shield 71 is positioned between terminal cover 84 and the freestanding end 77 of collector 76.

Collector assembly 100, shown in FIG. 5, can be manufactured using the following process steps. Inserting terminal contact end 79 of collector 76 through the center of electrode containment shield 71. Then securing the terminal contact end 79 of collector 76 to the central portion of terminal cover 84. In this embodiment, the terminal contact end 79 of collector 76 is inserted through the electrode containment shield prior to contacting the terminal contact end 79 of the collector 76 to terminal cover 84. In a similar process, collector assembly 70, shown in FIG. 6B, can be assembled using the following process steps. Forming closure member 72 by bringing inner cover 86 and seal body 78 into contact with one another. Placing terminal cover 84 into contact with inner cover 86. Inserting terminal contact end 79 of collector 76 through central opening 88 in seal body 78 until the terminal cover and terminal contact end of collector 76 abut one another. Then inserting freestanding end 77 of collector 76 through electrode containment shield 71. The terminal cover and collector may be secured to one another by soldering, welding, or with a suitable adhesive.

Referring to FIG. 7, collector assembly 68 can also be assembled using the following steps. Forming closure member 72 by bringing inner cover 86 and seal body 78 into contact with one another. Inserting terminal contact end 79 of collector 76 through central opening 88 in seal body 78 until the terminal cover and terminal contact end 79 of collector 76 abut one another. Then, inserting freestanding end 77 of collector 76 through electrode containment shield 71.

Figure 12:
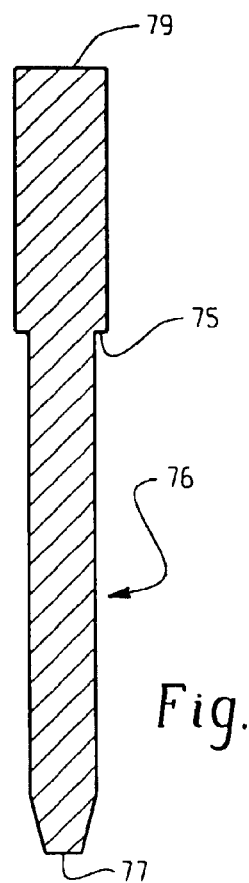
FIG. 12 is a cross section of a current collector.

To facilitate accurate and secure placement of shield 71 on collector 76, the diameter of collector 76 can be changed in order to create a shoulder against which the shield can be located. As shown in FIG. 12, shoulder 75 on collector 76 is created by reducing the diameter of collector 76 for a portion of the distance between freestanding end 77 and terminal contact end 79. Since the diameter of freestanding end 77 is less than the diameter of terminal contact end 79, the electrode containment shield can be forced along the length of collector 76 until it abuts shoulder 75.

The outside diameter of electrode containment shield 71 must be selected to cooperate with the inside diameter of the cylinder defined by separator 20. Preferably, the outside diameter of shield 71 is slightly less than the inside diameter of the open end 12 of container 10. More preferably, the outside diameter of shield 71 is slightly less than the inside diameter of the tube defined by the separator so that shield 71 does not touch separator 20 during the cell assembly process. If the outside diameter of the shield is too small, small fragments of the frangible electrode could possibly escape past shield 71 and contact first electrode 50 if the top of separator 20 becomes bent or wrinkled thereby providing an unobstructed path between the first and second electrodes. However, if the outside diameter of the shield is too large, the shield could come into contact with the separator and cause it to tear thereby allowing a fragment of one electrode to contact the other electrode. In an alternate embodiment, the perimeter of the shield could be serrated to facilitate the edge of the shield bending upward if the shield should contact the separator during the cell assembly process.

Referring to FIG. 8, after producing the current collector assembly and providing the open ended container, electrochemical cell 102 is assembled by joining current collector assembly 69 to the open end 12 of container 10. The joining process involves inserting freestanding end 77 of collector 76 into second electrode 60 until the current collector assembly's terminal cover 84 is proximate the open end 12 of container 10 and shield 71 is positioned between second electrode 60 and terminal cover 84. Preferably, shield 71 is positioned between edge 22 of separator 20 and second electrode 60 as shown in FIG. 9. Collector assembly 69 is secured to container 10 by crimping the open end of container 10 inwardly over the periphery of terminal cover 84. Alternate means for securing the collector assembly to the container include gluing and welding.

Figures 13A, 13B:
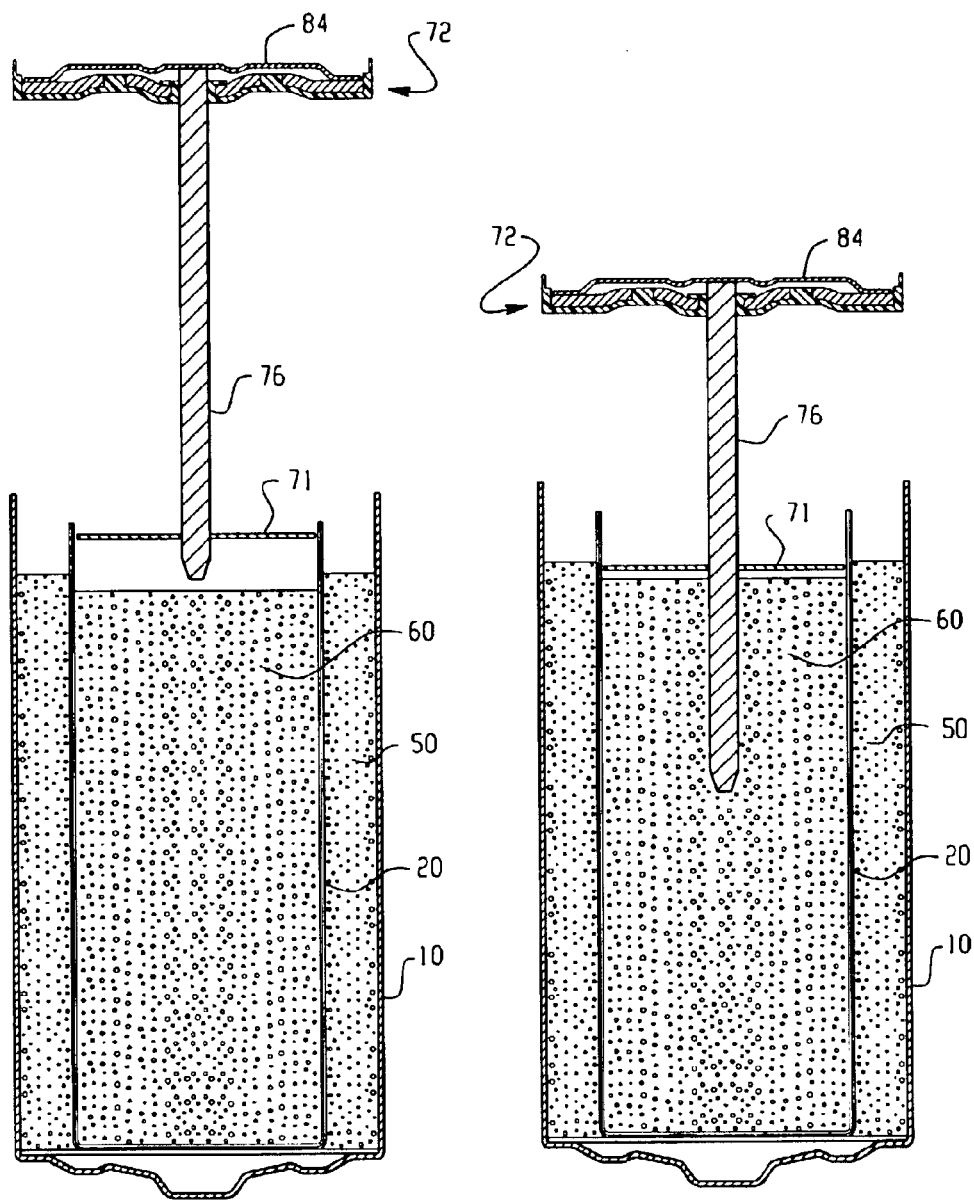
FIGS. 13A, 13B and 13C are cross sectional views of a cell as it is manufactured by a process of this invention.
Figure 13C:
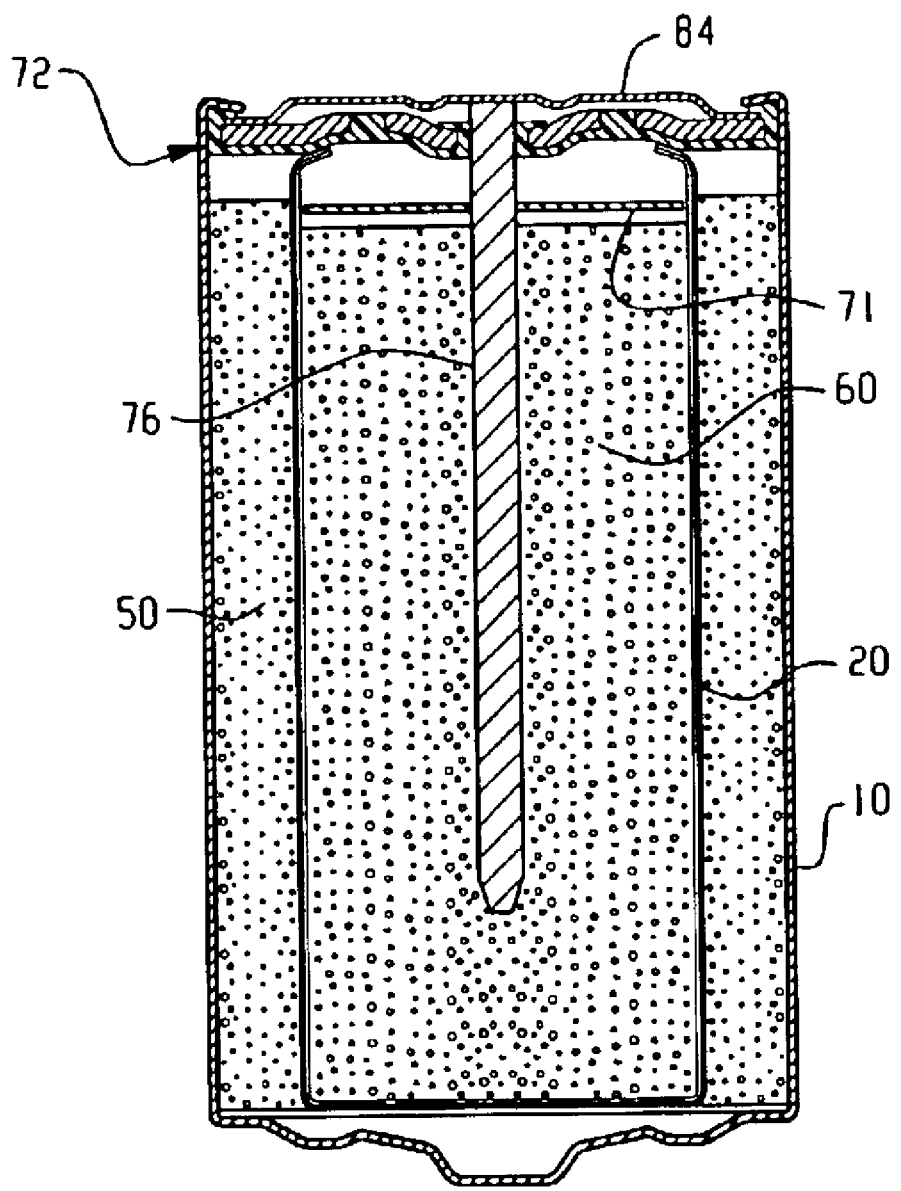
Figure 14:
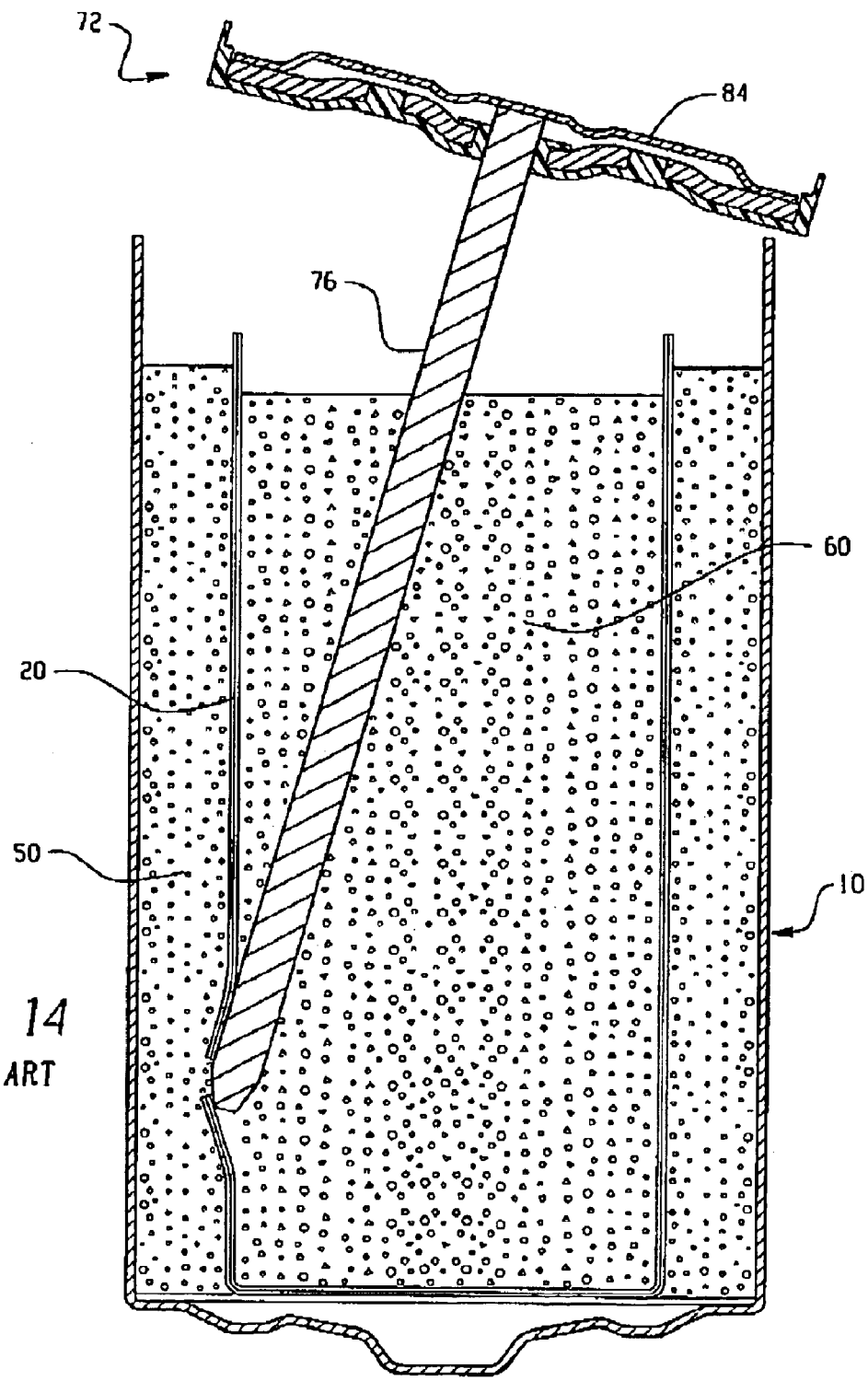
FIG. 14 is a cross sectional view of a conventional cell.

As shown in FIG. 13, electrode containment shield 71 can also be used to properly locate collector 76 within the central portion of the separator lined cavity defined by first electrode 50. Using the shield to center collector 76 as it is inserted into second electrode 60 is useful in preventing an electrical short circuit within the cell which is caused by an off center collector piercing the separator and establishing an electrical path between the first and second electrodes as shown in FIG. 14. Preferably, the process of using shield 71 as a locator for collector 76 incorporates the following step. Prior to joining the preassembled current collector assembly to the open ended container, shield 71 is positioned closer to the second end 77 of collector 76 than to the first end 79 of collector 76. Subsequently, during the insertion of the second end 77 of collector 76 into second electrode 60, shield 71 is forced along the length of collector 76 by second electrode 60 until the collector assembly 70 is proximate the open end 12 of container 10 and shield 71 is closer to the first end 79 of collector 76 than to the second end 77 of collector 76. To facilitate accurate centering of the collector, the diameter of shield 71 is preferably at least ninety percent of the diameter of the opening defined by coiled separator 20. More preferably, the diameter of the shield is between ninety-five percent and one-hundred percent of the diameter of the opening defined by coiled separator 20.

Figure 15:
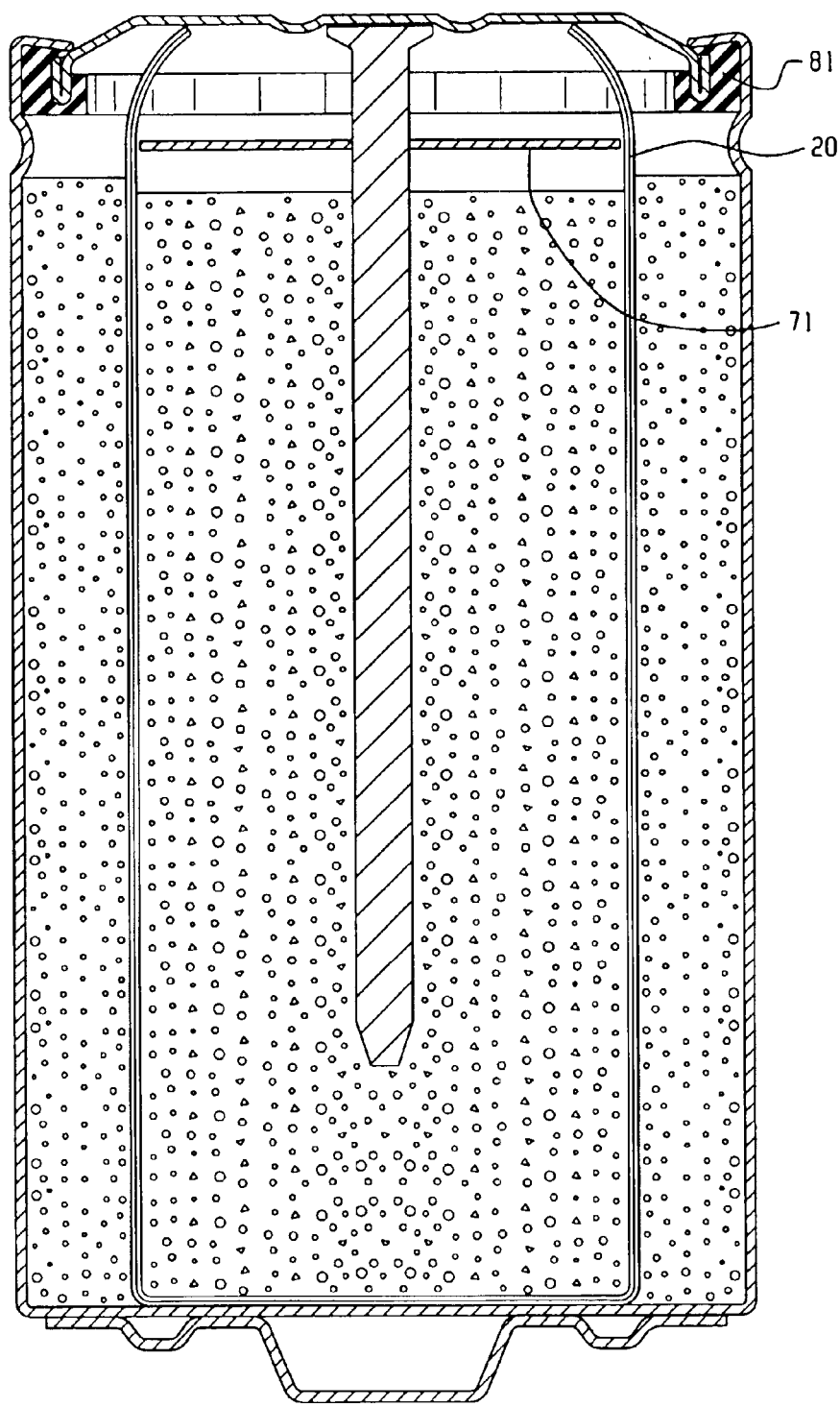
FIG. 15 is a cross sectional view of a cell manufactured by a process of this invention.

As used herein, the term "seal body" refers to a three dimensional elastomeric component that electrically insulates the cell's positive and negative components from one another and cooperates with the cell's container to close the open end of the container. The seal body may have a ventable diaphragm formed therein. Alternatively, the seal body may be formed as a circular gasket 81 as shown in FIG. 15. Seal bodies are conventionally formed by injection molding materials such as nylon, polypropylene and polystyrene. The term "low volume seal body" refers to a seal body that does not provide support to the upstanding tubularly shaped separator 20 as shown in FIG. 15.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

I claim:

1. A process for assembling an electrochemical cell, comprising the steps of:
   (a) providing a cylindrical open ended container comprising a first electrode defining a tubularly shaped cavity, a separator lining said cavity, and a second electrode disposed within said separator lined cavity, said second electrode comprising a frangible composition including particulate zinc;
   (b) producing a current collector assembly comprising a cover, an electrode containment shield having a width less than the inside diameter of said container's open end and an elongated electrically conductive member having a first end and a second end, said step of producing a current collector assembly comprising contacting an end of said electrically conductive member to said cover and inserting an end of said electrically conductive member perpendicularly through a disc shaped electrode containment shield thereby forming a preassembled current collector assembly, said first end of said electrically conductive member contacts said cover, said second end of said electrically conductive member forms a freestanding end that extends from said shield; and
   (c) joining said preassembled current collector assembly and said open ended container by inserting said second end of said assembly's conductive member into said second electrode and securing said current collector assembly to the open end of said container whereby said electrode containment shield is positioned between said cover and said second electrode.

2. The process of claim 1 wherein said first end of said member is inserted through said electrode containment shield prior to contacting said first end of said member to said cover.

3. The process of claim 1 wherein said step of contacting said first end of said member to said cover precedes inserting said second end of said member through said electrode containment shield.

4. The process of claim 1 wherein said current collector assembly comprises a closure member and said step of producing a current collector assembly further includes inserting said elongated member through said closure member.

5. The process of claim 4 wherein said closure member comprises an inner cover.

6. The process of claim 4 wherein said closure member comprises a seal body.

7. The process of claim 4 wherein said separator does not contact said seal body.

8. The process of claim 6 wherein said seal body comprises a gasket.

9. The process of claim 6 wherein said seal body comprises a ventable diaphragm.

10. The process of claim 4 wherein said first end of said member is inserted through said closure member prior to contacting said first end of said member to said cover.

11. The process of claim 10, wherein said first end of said member is inserted through said electrode containment shield and said closure member prior to contacting said first end of said member to said cover.

12. The process of claim 4 wherein said step of contacting said first end of said member to said cover precedes inserting said second end of said member through said closure member and then said electrode containment shield.

13. The process of claim 4 wherein said first end of said member is inserted through said closure member prior to contacting said member to said cover and inserting said second end of said member through said electrode containment shield.

14. The process of claim 1 wherein said shield is electrically nonconductive.

15. The process of claim 1 wherein said shield is electrically conductive.

16. The process of claim 1 wherein said second electrode comprises a frangible gel.

17. The process of claim 1 wherein said shield is coaxial with said elongated member.

18. The process of claim 1 wherein said elongated member comprises an electrically conductive material.

19. The process of claim 18 wherein said elongated member comprises copper.

20. The process of claim 1 wherein the outside diameter of said elongated member forms an interference fit with said shield.

21. The electrochemical cell of claim 1 wherein said separator forms an open-ended tubularly shaped compartment comprising an upstanding portion having an edge extending beyond said first electrode toward the open end of said container, said shield positioned between the edge of said separator's upstanding portion and said second electrode.

22. The electrochemical cell of claim 1 wherein said separator forms an open-ended tubularly shaped compartment having an inside diameter greater than the maximum width of said shield.

23. The process of claim 1, wherein said elongated member comprises a shoulder defined by a change in the outside diameter of said member.

24. The process of claim 23, wherein said step of inserting said member through said shield further includes abutting said shield against said shoulder.

25. The process of claim 1, wherein, prior to joining said preassembled current collector assembly to said open ended container, said shield is closer to said second end of said member than to said first end of said member and during said step of inserting said second end of said member into said second electrode, said second electrode forces said shield along the length of said elongated member until said collector assembly is proximate the open end of said container and said shield is closer to said first end of said member than to said second end of said member.

26. The process of claim 25, wherein said shield positions said elongated member within the cavity defined by said separator lined first electrode during the step of inserting said elongated member into said second electrode.

27. The process of claim 25, wherein said shield centers said elongated member within the cavity defined by said separator lined first electrode during the step of inserting said elongated member into said second electrode.

\* \* \* \* \*